US 6,721,089 B1

(12) United States Patent
Miller et al.

(10) Patent No.: US 6,721,089 B1
(45) Date of Patent: Apr. 13, 2004

(54) METHOD AND APPARATUS FOR EXPANDING THE DYNAMIC RANGE OF OPTICAL AMPLIFIERS

(75) Inventors: Donald J. Miller, Roswell, GA (US); John Brownlee, Tucker, GA (US); Jun Bao, Ellicott City, MD (US); Si Hyung Cho, Silver Spring, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/002,928

(22) Filed: Nov. 4, 2001

(51) Int. Cl.⁷ ................................................. H01S 3/00
(52) U.S. Cl. .................................................. 359/341.3
(58) Field of Search ............................. 372/30, 31, 32, 372/38.03, 38.06, 38.07; 359/341.3, 341.31

(56) References Cited

U.S. PATENT DOCUMENTS

| | | | |
|---|---|---|---|
| 5,485,481 A | 1/1996 | Ventrudo et al. ............... 372/6 |
| 5,563,732 A | 10/1996 | Erdogan et al. ............. 359/341 |
| 5,589,684 A | 12/1996 | Ventrudo et al. ........... 250/225 |
| 5,721,636 A | 2/1998 | Erdogan et al. ............. 359/341 |
| 5,867,305 A | 2/1999 | Waarts et al. ................ 359/341 |
| 5,933,271 A | 8/1999 | Waarts et al. ................ 359/341 |
| 5,991,325 A | * 11/1999 | Ohtomo et al. ................ 372/69 |
| 6,061,373 A | * 5/2000 | Brockman et al. ........ 372/38.06 |
| 6,178,037 B1 | * 1/2001 | Sugaya et al. ............ 359/341.3 |
| 6,483,630 B2 | * 11/2002 | Kosaka .................. 359/337.11 |

FOREIGN PATENT DOCUMENTS

JP        08068723 A  *  3/1996  ........ G01M/11/00

* cited by examiner

Primary Examiner—Thomas G. Black
Assistant Examiner—Deandra Hughes
(74) Attorney, Agent, or Firm—Michael R. Cammarata

(57) ABSTRACT

The dynamic range of an optical amplifier is extended by the addition of a power control circuit. A switch is interposed between a current source and an optical pump supplying pumping light to the gain medium of the optical amplifier. A modulated signal such as a pulse-width modulated signal is used to actuate the switch and control a relative duration of the "on" and "off" periods of the electrical current supplied to the optical pump. Gain latency in the optical amplifier permits a substantially continuous signal to be output from the optical amplifier in response to the switched electrical current supply to the optical pump. A controller may used a feedback signal from the optical pump or from a power monitoring device to control the modulator and, thereby, the switch. A target pump power level, target gain or target amplified signal power level may also be applied in a feedback control loop that controls the modulator and switch. The invention also takes the form of a method that may be used to control a conventional optical amplifier in order to expand the dynamic range, particularly in the low power region.

30 Claims, 13 Drawing Sheets

METHOD AND APPARATUS FOR EXPANDING THE DYNAMIC RANGE OF OPTICAL AMPLIFIERS

BACKGROUND OF THE INVENTION

1. Field of Invention

The invention generally relates to optical amplifiers. The invention more particularly relates to a method and apparatus for controlling an optical amplifier exhibiting gain latency that is particularly well-suited to operating the amplifier at low pump output power and/or low gain values.

2. Description of Related Art

An Erbium-Doped Fiber Amplifier (EDFA) is a common and essential component in many fiber-optic communications networks. As the optical signal travels through the many kilometers of fiber optics, losses are incurred, and amplification of the signal becomes necessary.

The block diagram of an EDFA is quite simple as illustrated in FIG. 1. Essentially, a "Pump" light source (typically a pump laser 2 as shown) at either 980 nm or 1480 nm is summed in with the input optical signal 1 by using a coupler 4, and then the combined signal is sent through a length of erbium-doped fiber 6. The pump source 2 excites the erbium atoms in fiber 6 is such a way as to cause them to release multiple photons at the ~1550 nm wavelength for every single input photon at ~1550 nm. At the end of the erbium-doped fiber 6, the pump source 2 has been substantially absorbed, and the input 1550 nm signal 1 has been amplified to produce amplified output signal 8. Some portion of the energy from the pump source 2 has been transferred to the input signal 1 to achieve this amplification.

FIG. 1 shows a very simplified block diagram of an EDFA. Practical implementations may contain additional or substitute optical components and may be somewhat more complex. For example, instead of a coupler 4 a thin film filter or other conventional element may be utilized to combine the pump light with the input signal 1 light.

FIG. 2 illustrates other details of a conventional EDFA including a power supply 9 driving a variable current source 5 that feeds a DC drive current to pump laser 2. The conventional technique for controlling the gain and output power of the EDFA 7 is to control the variable current source 5. In other words, if more gain is desired then the current source 5 may be controlled to supply a higher DC current to the pump laser 2 which, in turn, causes pump laser 2 to output pump light having a higher optical power.

Most often, a variable current source 5 is used to bias the pump laser 2, as shown in FIG. 2. The pump laser 2 power output increases as the laser driving current is increased. Not shown in FIG. 2 is the usual closed-loop power control, where a conventional "back-facet" current is sensed by, for example, a back-facet PIN diode inside the laser package and used to control the current-source 5 in closed-loop fashion.

The complexity of fiber-optic networks is increasing, and amplifiers with very wide gain range are becoming useful. Conventional EDFAs such as those shown in FIGS. 1 and 2 that are designed for high gain applications, however, are not capable of producing low gain values that are stable and controllable. To produce a high gain EDFA a relatively long length of Erbium doped fiber 6 is pumped by a laser(s) utilizing a relatively high level of pump power. Likewise, low gains are possible by using a rather short length of Erbium doped fiber and a reasonably high pump power. The challenge is to implement an optical amplifier capable of high gain but still able to be throttled back to produce a stable low gain.

More specifically, an amplifier containing sufficient erbium-doped fiber 6, and a pump 2 capable of producing sufficient power for realizing high gains may have operational problems when required to operate at low gain or power levels. The pump power required at gains near unity may cause the laser 2 to be operated very near threshold. Some types of pump lasers may mode-hop more severely at these levels, and the back-facet power monitor may not produce an output signal sufficient to allow proper operation of the laser constant-power control circuitry.

FIG. 3 illustrates a source of the problems associated with conventional EDFAs operating at low output powers. Specifically, FIG. 3 plots output power of a conventional EDFA as a function of pump power (in this case a 980 nm pump laser is used). Below approximately 15 mW pump power, the corresponding EDFA output power enters a non-linear or otherwise highly unstable region. In other words, small variations in the pump power will cause large fluctuations in the EDFA output power. This is generally true of all conventional EDFAs.

FIG. 4 illustrates another difficulty of conventional EDFAs. Namely, the erbium absorption is a function of pump wavelength. FIG. 4 plots the normalized erbium absorption (a measure of how many of erbium ions have transitioned to higher energy states as a result of the pump light) as a function of pump wavelength. This wavelength dependency means that variations in the pump laser wavelength will vary the erbium absorption that, in turn, will vary the gain. This point is further illustrated in FIG. 5 which plots EDFA gain as a function of pump wavelength. Clearly, the EDFA gain may vary by 4 or 5 dB in this example depending upon pump wavelength. If the pump laser 2 is operated near its threshold (in this case approximately 10 mW) then mode competition may cause the pump wavelength to destabilize which, in turn, destabilizes the EDFA gain and output power.

FIG. 6 clearly exhibits this instability by plotting the pump power and back monitor current fluctuation (in percentage terms) as a function of pump light optical power. As can be seen, low pump powers cause large percentage fluctuations in the EDFA output power. Such pump power fluctuations are typically caused by pump mode competition. Significantly, such pump power fluctuations will transfer to EDFA gain and power fluctuations.

FIG. 7 shows even greater power fluctuations which are largely the result of a different type of pump laser 2. The pump laser associated with FIG. 6 is a Fabry-Perot laser while the pump laser associated with FIG. 7 is a Bragg-grating stabilized laser which is more susceptible to mode hopping or mode competition, particularly at low pump powers. Such mode hopping can destabilize or otherwise alter the pump output wavelength. As shown in FIG. 5, changes in the pump wavelength will cause gain fluctuations. Thus, severe mode hopping or competition at low pump powers is a serious problem that causes unwanted EDFA gain and output power fluctuations.

SUMMARY OF THE INVENTION

This invention includes a method and system for overcoming the difficulties of operating pump lasers at the low powers necessary for low EDFA gains. The result is to allow implementation of EDFA and other amplifiers with relatively wide controllable variable gain.

To that end, the inventive optical amplifier was developed that includes a gain media exhibiting gain latency and receiving an input optical signal; an optical pump optically coupled to said gain media, said optical pump supplying pumping light to said gain media, said pumping light having at least one wavelength sufficient to induce gain in the input optical signal; a current source operatively connected to said optical pump, said current source providing a drive current to said optical pump; a switch interposed between said current source and said optical pump; a modulator operatively connected to said switch; said modulator generating modulated signals having a duty cycle and supplying the modulated signals to said switch, said switch actuating in response to the modulated signal such that said switch repeatedly turns the drive current "on" and "off".

The inventive optical amplifier may also include a controller operatively connected to said modulator, said controller supplying a control signal to said modulator to control the duty cycle of the modulated signal, said modulator generating modulated signals in response to the control signal.

The controller may also be operatively connected to said optical pump such that said controller receives a feedback signal from said optical pump indicative of the pumping light generated by said optical pump, said controller utilizing the feedback signal to control the duty cycle of the modulated signal.

The controller may also receive a target indicative of a target pump power level to be achieved by said optical pump and the controller may feedback control said modulator according to the feedback signal such that said optical pump substantially achieves the target. Alternatively, the controller may store the target rather than receive it.

Alternatively, the invention may also include an optical power monitor optically coupled to an output of the optical amplifier; said controller also operatively connected to said optical power monitor, said controller receiving a feedback signal from said optical power monitor indicative of an optical power of the signal output from the amplifier, and said controller utilizing the feedback signal to control the duty cycle of the modulated signal.

In another construction consistent with the invention a receiver may be optically coupled to an output of the optical amplifier; a power monitoring circuit operatively may be coupled to said receiver; and said controller may be operatively connected to said power monitoring circuit such that said controller receives a feedback signal from said power monitoring circuit indicative of an optical power of the signal output from the amplifier and utilizes the feedback signal to control the duty cycle of the modulated signal.

The modulator may be a pulse-width modulator generating pulse-width modulated signals in response to the control signal and supplying the pulse-width modulated signals to said switch. In this construction, the controller may supply the control signal to control a duty cycle of the pulse-width modulated signal.

The modulator may also be a frequency modulator that modulates a frequency of pulses having a fixed pulse-width, generates frequency modulated signals in response to the control signal, and supplies the frequency modulated signals to said switch. In this construction, the controller may supply the control signal to control a duty cycle of the frequency modulated signal.

The inventive gain media may take many forms such as a length of erbium doped fiber, a length of thulium doped fiber, an erbium doped waveguide, or a thulium doped waveguide.

Moreover, the optical pump may include a back-facet diode, the back-facet diode supplying the feedback signal to said controller.

The invention may also be constructed such that the current source and the switch are integrated in a switched current source operatively connected to said optical pump and to said modulator, wherein said switched current source actuates in response to the modulated signal such that said switch repeatedly turns the drive current "on" and "off".

The invention may also be characterized as a power control circuit for an optical amplifier exhibiting gain latency and having an optical pump powered by a drive current from a current source, including: a switch interposed between the current source and the optical pump; and a modulator operatively connected to said switch; said modulator generating modulated signals having a duty cycle and supplying the modulated signals to said switch, said switch actuating in response to the modulated signal such that said switch repeatedly turns the drive current "on" and "off". All of the above configurations, constructions and functionalities described above also apply to the inventive power supply circuit.

In addition, the invention includes a method of controlling an optical amplifier exhibiting gain latency and having an optical pump driven by an electrical current, comprising: switching the electrical current supplied to the optical pump "on" and "off"; and controlling said switching with a modulated signal having a duty cycle in order to control a relative duration of the "on" and "off" periods of the electrical current supplied to the optical pump, wherein the gain latency in the optical amplifier permits a substantially continuous signal to be output from the optical amplifier in response to the switched electrical current supply to the optical pump.

The inventive methods further include receiving a feedback signal from the optical pump indicative of the pumping light generated by the optical pump, and utilizing the feedback signal to control the duty cycle of the modulated signal.

The inventive methods may also include inputting a target indicative of a target pump power level to be achieved by the optical pump; and feedback controlling the duty cycle of the modulated signal according to the feedback signal such that the optical pump substantially achieves the target.

The inventive method may further include receiving a feedback signal from a power monitoring device indicative of an optical power of the signal output from the amplifier, and utilizing the feedback signal to control the duty cycle of the modulated signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 8:
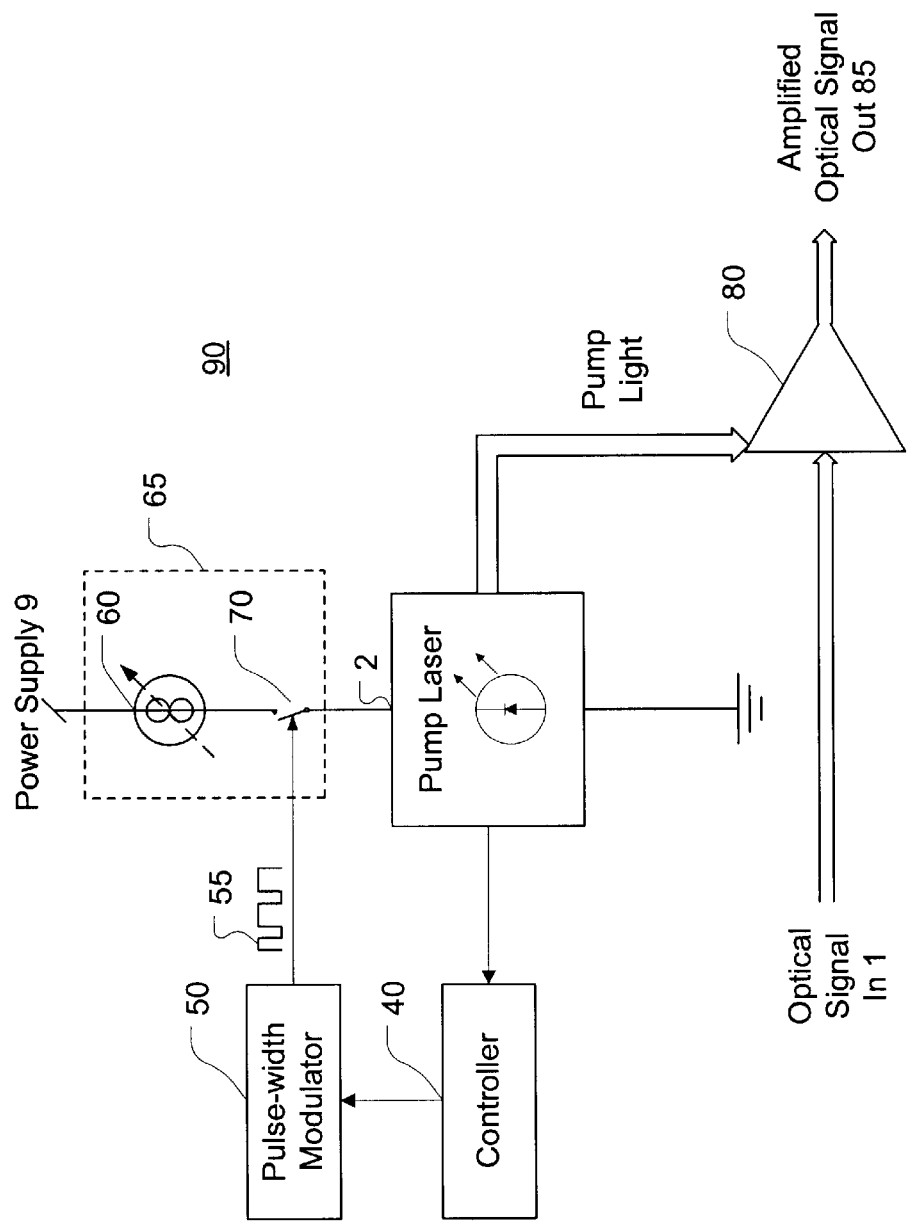
FIG. 8 is a high level block diagram illustrating components of an inventive optical amplifier.

FIG. 8 illustrates an amplifier system 90 including conventional elements such as pump laser 2 that preferably includes the conventional back-facet diode or other power measuring device that is capable of providing a feedback signal to the controller 40.

The pump laser 2 supplies pump light to the optical amplifier 80. The optical amplifier 80 may be an EDFA, an EDWA (erbium doped waveguide amplifier), TDFA (thulium doped fiber amplifier), TDWA, rare-earth doped fiber or waveguide amplifier, or any other optical amplifier whose gain is driven by pump light from one or more pumping lasers and whose gain media exhibits gain latency. Preferably, the optical amplifier 80 has a sufficient amount of gain media (e.g. erbium doped fiber) to produce a high gain.

A characteristic of an EDFA and other optical amplifiers 80 is gain latency. The invention utilizes this characteristic to advantage. After the pump signal has been applied and the erbium fiber (or other gain media) has been excited, the pump signal can be removed and the amplifier will still exhibit gain for a finite period of time. It is not uncommon for an EDFA to still have gain for milliseconds or tens of milliseconds after the pump signal is removed. The same is true of many other optical amplifiers.

Figure 1:
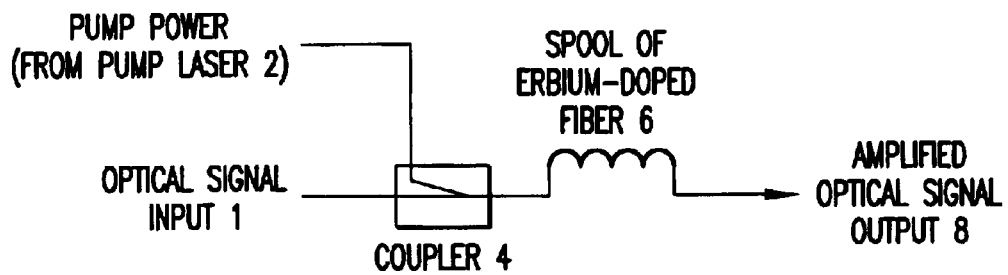
FIG. 1 illustrates a conventional erbium doped fiber amplifier (EDFA) useful for amplifying optical signals.
Figure 2:
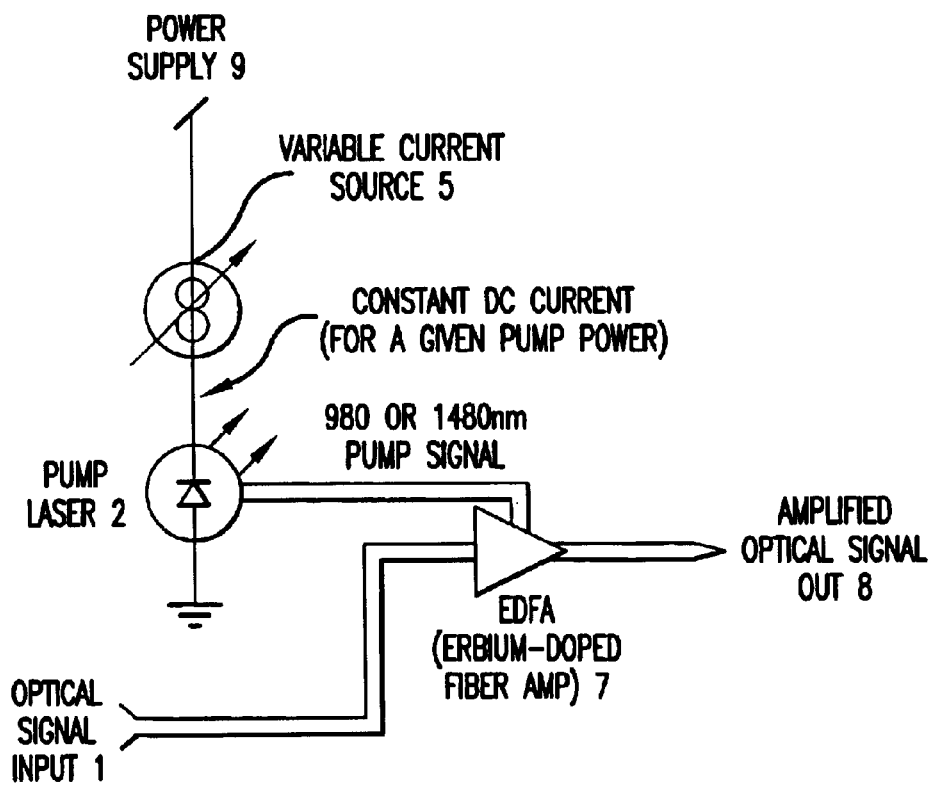
FIG. 2 further illustrates the conventional erbium doped fiber amplifier of FIG. 1 including a conventional variable current source supplying a DC current to the pump laser.
Figure 3:
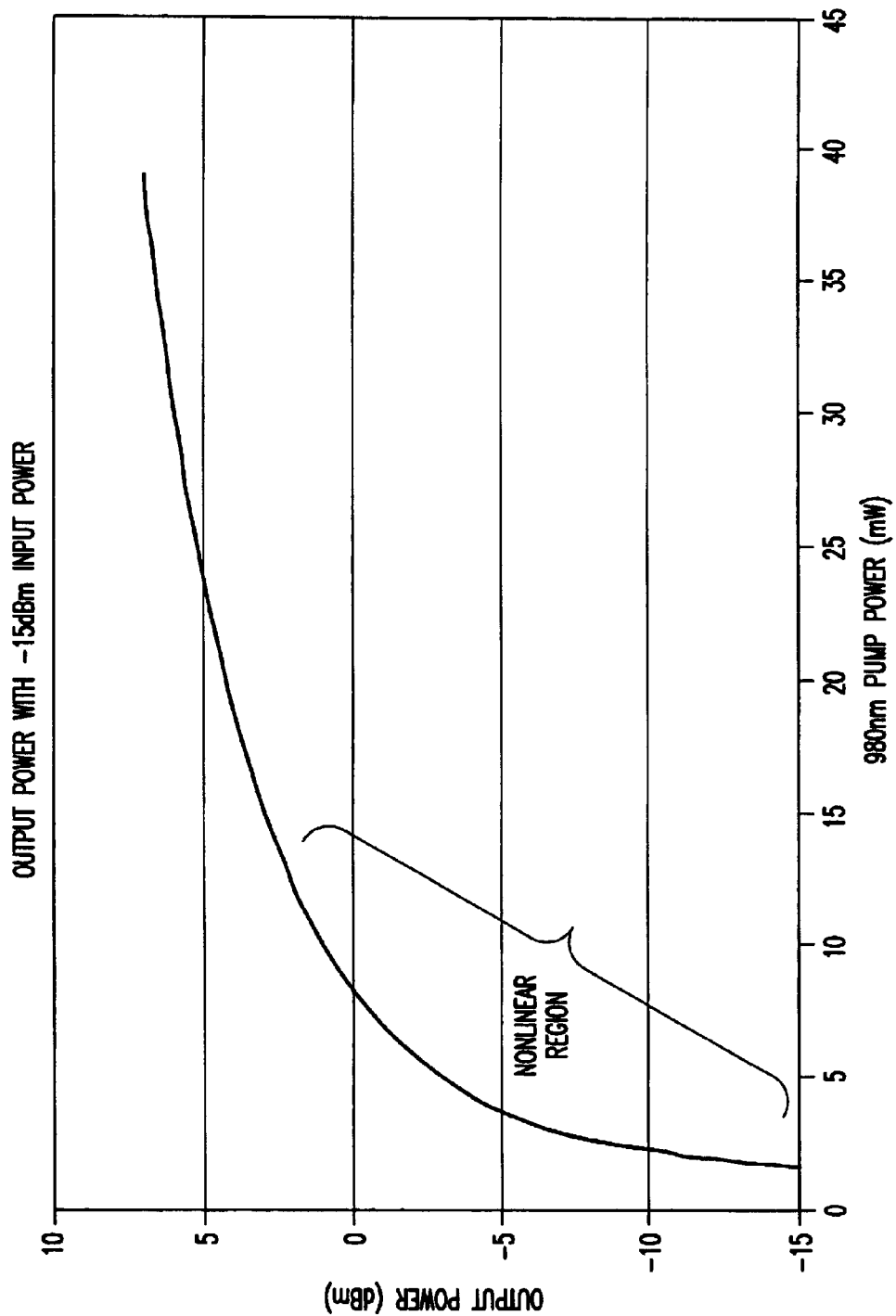
FIG. 3 is a graph of a typical EDFA output power as a function of pump power that is useful in illustrating disadvantages of conventional EDFAs.
Figure 4:
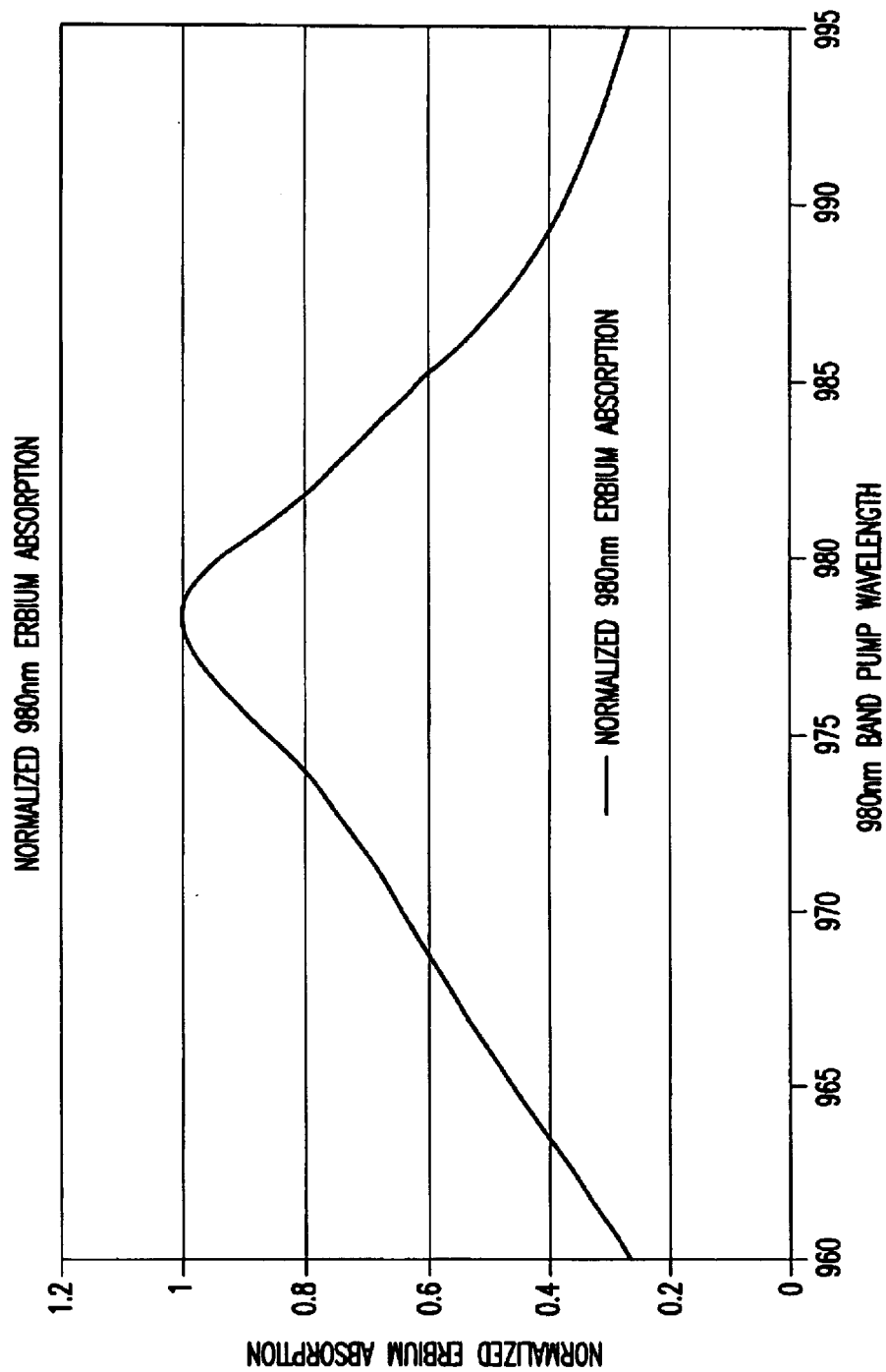
FIG. 4 is a graph of a typical EDFA erbium absorption as a function of pump wavelength that is useful in illustrating disadvantages of conventional EDFAs.
Figure 5:
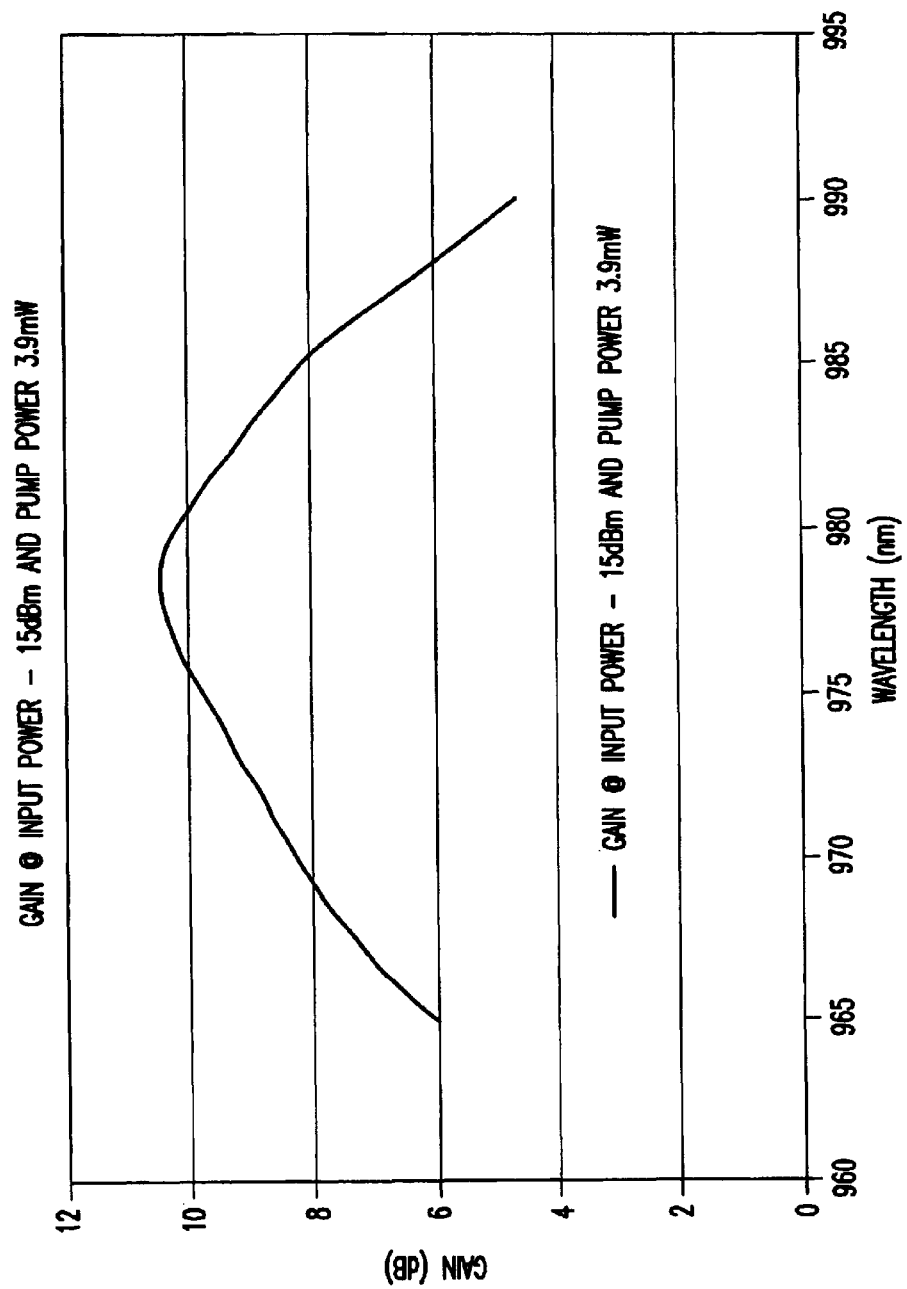
FIG. 5 is a graph of a typical EDFA gain as a function of pump wavelength that is useful in illustrating disadvantages of conventional EDFAs.

In other words, the gain latency makes the optical amplifier gain insensitive to very short-term variations in pump power. The gain is a function of average pump power. As recognized by the inventors, these properties make it possible to replace the conventional DC variable current source 5 (FIG. 2) driving the pump laser 2 with a pulsed current source that has a relatively high peak output current, but a controllable variable duty cycle.

More specifically and as shown in FIG. 8, the amplifier system 90 includes a current source 60 powered by a power supply 9. The current source 60 may be a variable current source or a fixed current source as indicated by the dashed arrow in the current source symbol. Significantly, the current source 60 is operatively connected to a controllable switch 70 (e.g. an FET, bipolar transistor, thyristor or SCR from an AC source, vacuum tube etc). It is also possible, but not preferred, to use a thyristor or SCR (silicon controlled rectifier) from an AC source to implement a PWM signal at the line rate where the switch element performs both switching and rectification at the same time to convert the AC to a pulsed DC waveform.

The controllable switch 70 is operatively connected to a pulse-width modulator 50 that feeds a pulse-width-modulated signal 55 to a control input of the switch 70. Pulse width modulator 50 is a conventional circuit in an of itself and may be constructed in a variety of manners as is well known in the art. Generally speaking, the pulse-width modulator 50 is preferably constructed with electronic circuitry to keep the cost and complexity to a minimum.

As further shown in FIG. 8, a controller 40 is operatively connected to the pulse-width modulator 50 may also be connected to the pump laser 2. Like pulse-width modulator 50, controller 40 may also be constructed with electronic circuitry. Moreover, circuits 40 and/or 50 may be implemented using a specially programmed general purpose microprocessor, an ASIC, FPGA, etc.

Controller 40 may also input a feedback signal from the pump laser 2. Typically, this feedback signal is supplied from the back-facet diode that is conventionally included in the pump laser 2 and measured the optical power of the pump light generated by the pump laser 2. The feedback signal may also come from sources other than a back-facet diode as it need only be indicative of the pumping light generated by the pump 3.

By utilizing the feedback signal from the pump laser 2, the controller 40 may command the pulse-width modulator 50 to adjust the pulse width or duty ratio of the pulse width modulated control signal 50 supplied to switch 70. In this control implementation, the peak pump power would preferably be constant, but the average laser power would be this peak power multiplied by the duty cycle percentage of the pulsed laser current. For example, if the pump laser 2 was pulsed "on" for 100 ns, and then left "off" for the next 900 ns (10% duty cycle at 1 MHz), the average pump power would be 10% of the peak power.

While the pump laser 2 is "on" (during the actual current pulses), it preferably operates at a level well above its operating threshold. Thus, the pump laser 2 operates in a stable region where gain and output power fluctuations are substantially minimized. This operating threshold varies according to the type of pump laser 2 being utilized but is a value easily looked up or derived.

Figure 6:
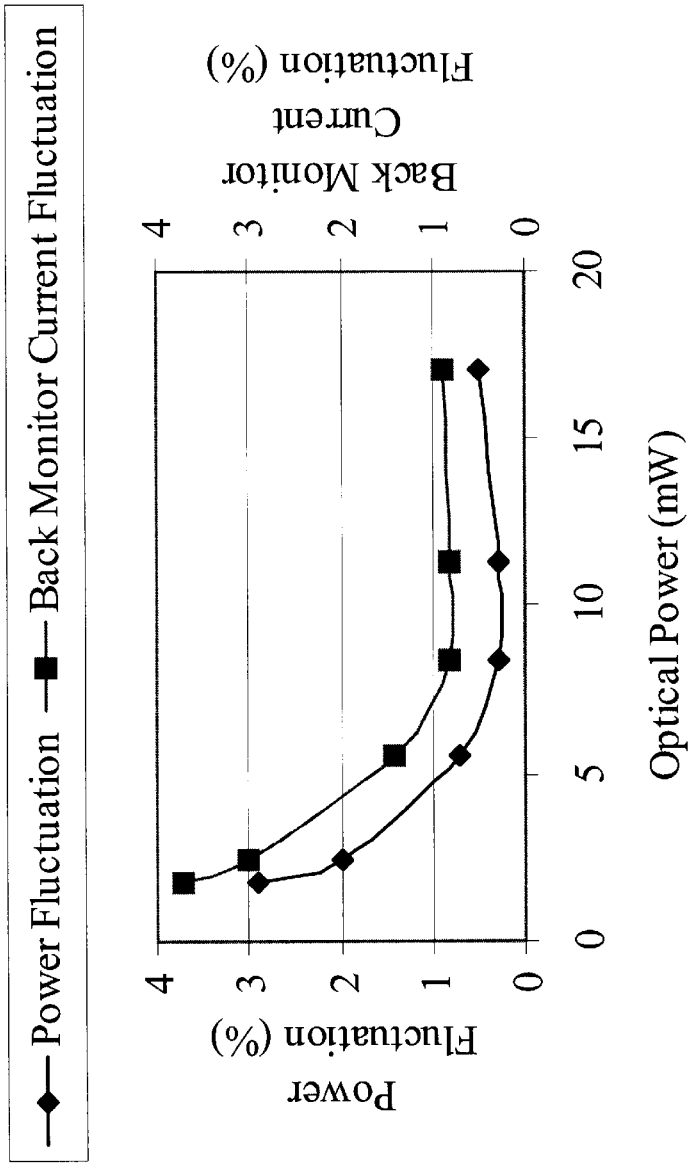
FIG. 6 is a graph illustrating a typical Fabry-Perot pump laser performance and showing pump power and back monitor current fluctuation as a function of operating power that will lead to poor EDFA performance and controllability at low pump powers.
Figure 7:
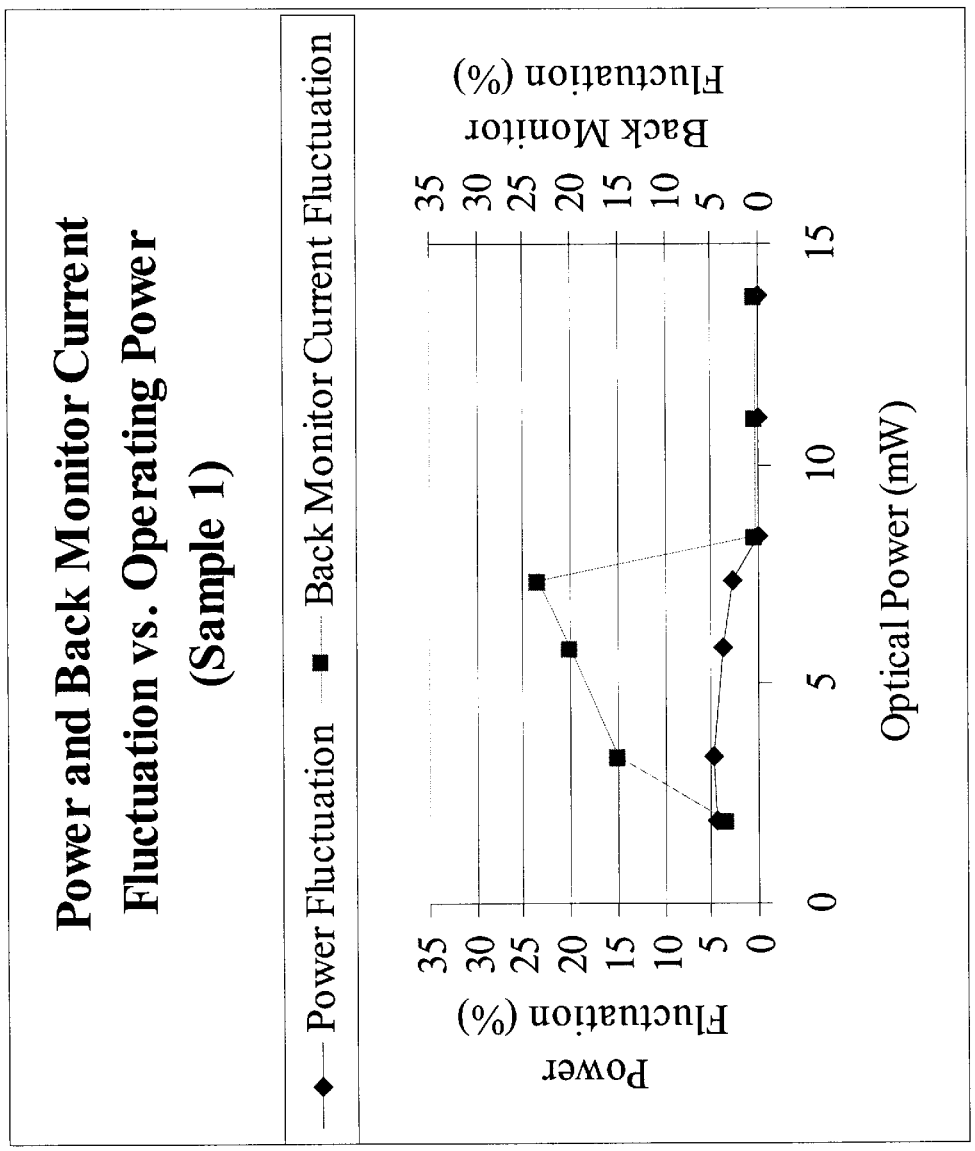
FIG. 7 is a graph illustrating a typical Bragg grating stabilized pump laser performance and showing pump power and back monitor current fluctuation as a function of operating power that will lead to poor EDFA performance and controllability at low pump powers.

The back-facet diode in the pump laser 2 also preferably "sees" pump light well above its minimum detectable signal strength. Thus, the feedback signal from the back-facet diode will not suffer substantial power fluctuations such as those shown in FIGS. 6 and 7. In this way, a stable feedback signal may be utilized as a reference upon which amplifier control may be based by the controller 40.

Figure 9A:
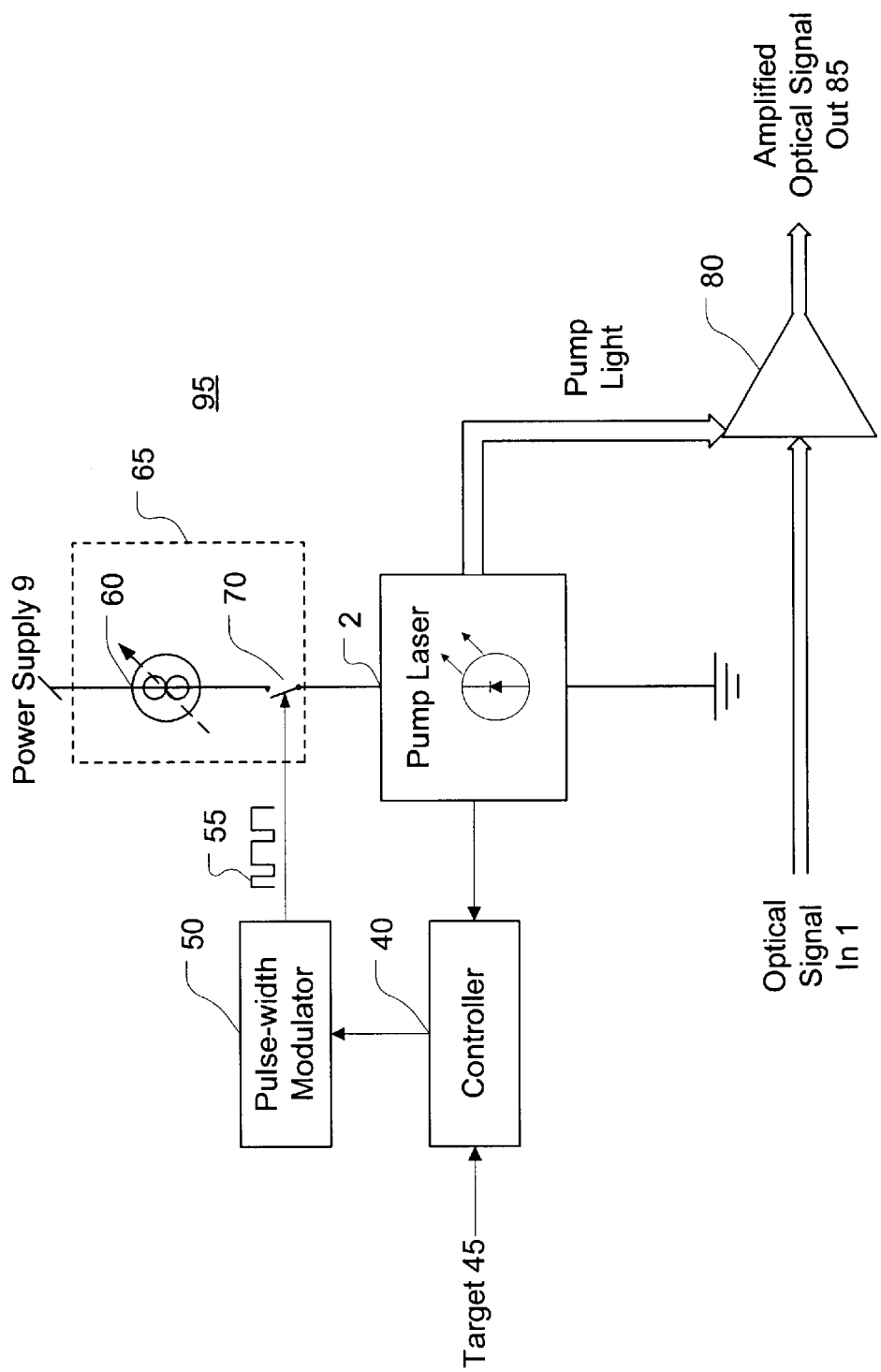
FIG. 9a is a high level block diagram illustrating components of an inventive optical amplifier alternative.

FIG. 9a shows an amplifier system 95 which is a variation of the amplifier system 90 shown in FIG. 8. The main difference therebetween is the controller 40 which now accepts a target 45 value that may be used as a control point. More specifically, controller 40 may input a target 45 value indicative of the target pump power, amplifier gain or output power to be achieved by the optical amplifier 80. In other words, a command may be sent to or otherwise received by the controller 40 in the form of a target 45 value such that the controller 40 may adjust the pulse width modulator 50 and supply the pump laser 2 with an adjusted duty cycle that would produce a desired pump power, amplifier gain or amplifier output power level. A feedback control loop may be formed using the power measurement from pump laser 2 and the target 45 to produce a desired pump power level or amplified optical signal output 85 having a desired gain or power level.

Figure 9B:
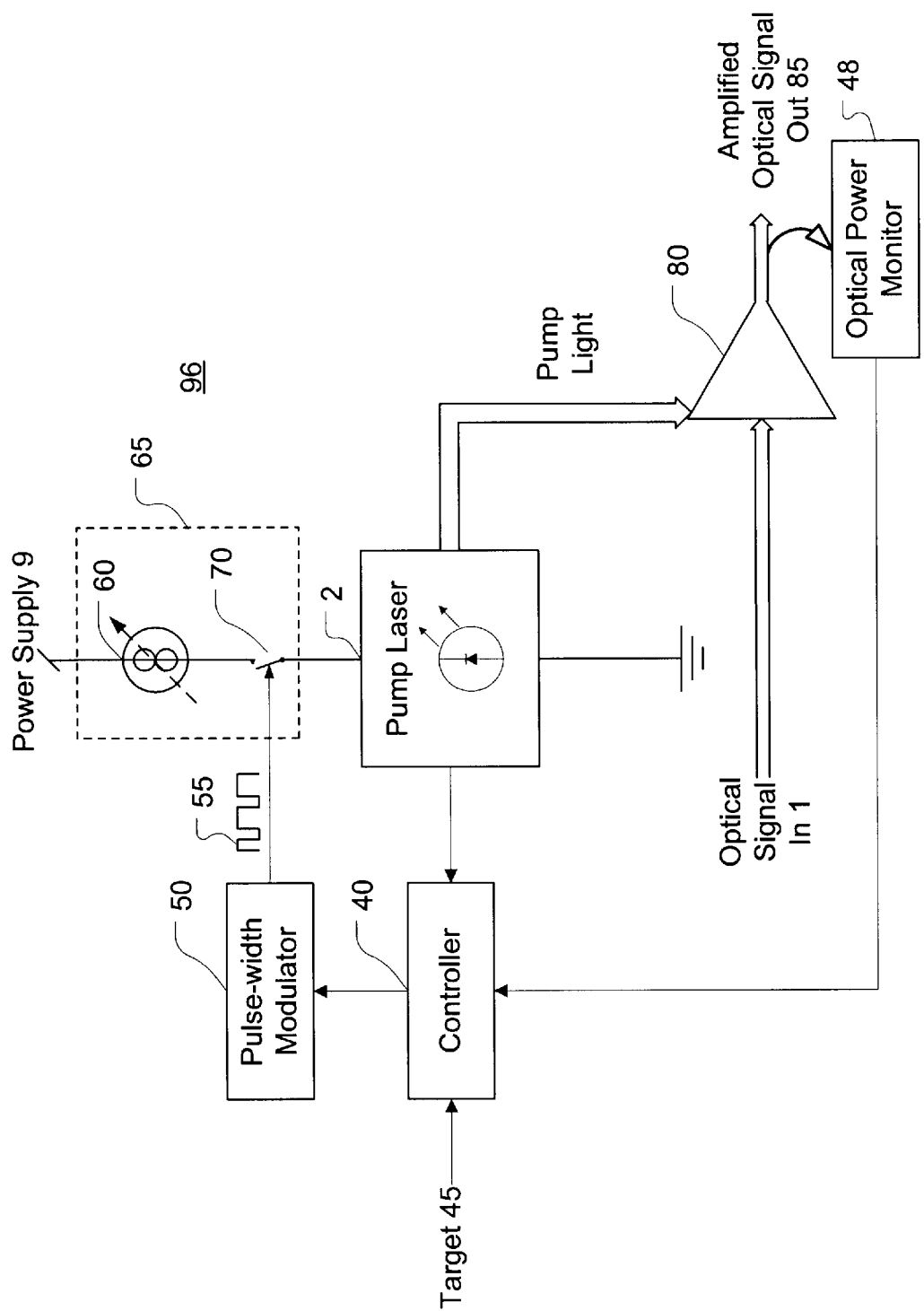
FIG. 9b is a high level block diagram illustrating components of an inventive optical amplifier alternative in which a feedback signal is derived from the output of the amplifier.

To better control the amplifier gain or amplifier output power level, a feedback signal taken from the amplifier 80 output is preferred. For example and as shown in FIG. 9b, an amplifier system 96 taps the output of the amplifier 80 to supply the optical power monitor 48 with a portion of the amplified signal 85. The optical power monitor 48 is a conventional device that outputs a measurement of optical power that can be used as a feedback signal to the controller 45 as shown.

Figure 9C:
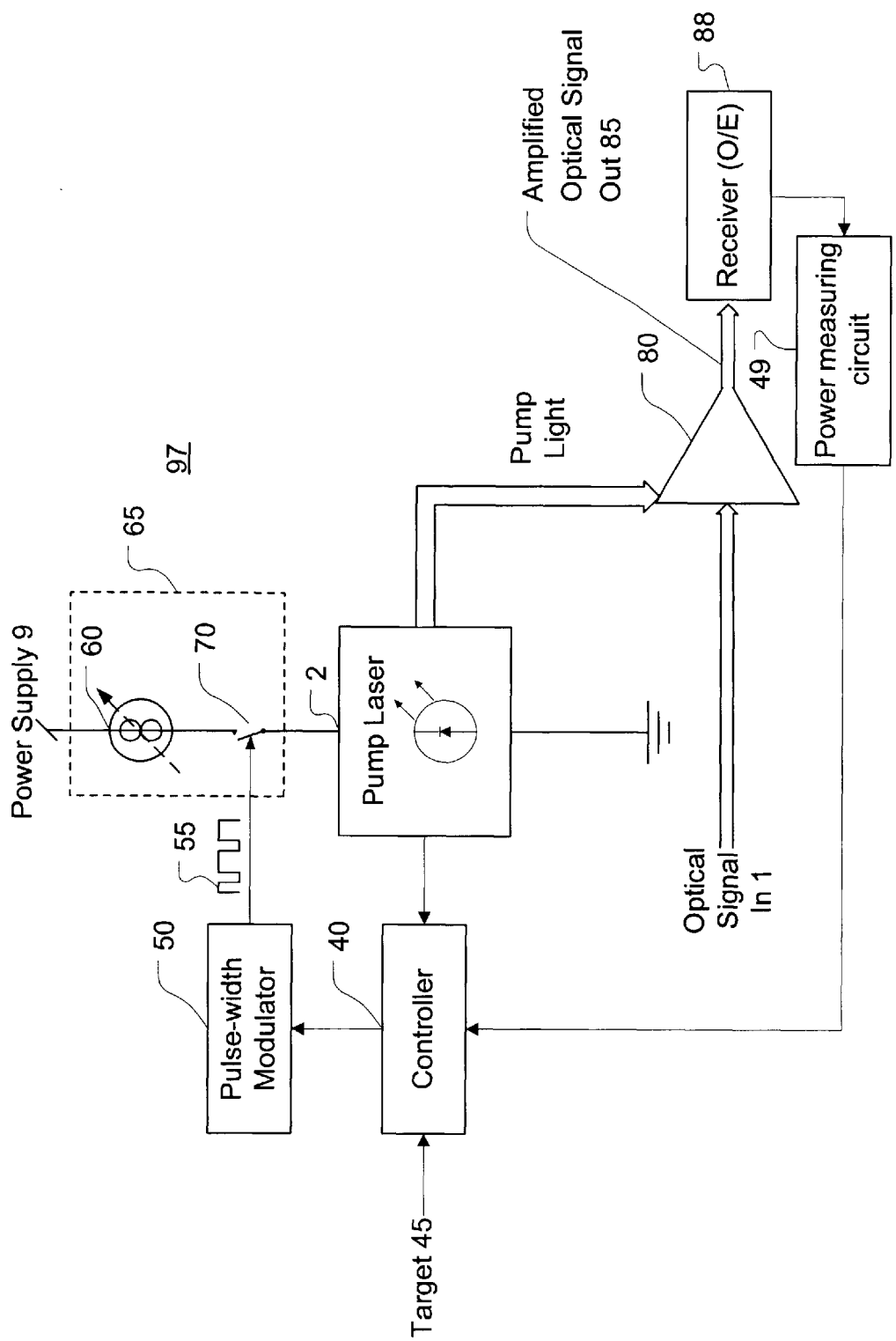
FIG. 9c is a high level block diagram illustrating components of a yet another inventive optical amplifier alternative in which a feedback signal is derived from the output of the amplifier.

FIG. 9c illustrates another amplifier system 97 showing another alternative to providing a feedback signal from the output of the amplifier 80. As shown therein, the output of the amplifier 80 is fed to a receiver 88 that performs an O/E (optical to electrical) conversion. Such receivers 88 are conventional elements (e.g. using a PIN, APD or other conventional O/E conversion element) and may also include other conventional elements such as an optical demultiplexer to segregate a wavelength from a WDM signal. The receiver 88 is preferably the same receiver used in an optical network to convert the signal 88 to an electrical signal. The output of the receiver 88 is fed to a power measuring circuit 49 which is another conventional element that outputs an electrical signal indicative of the optical power of amplified signal 85. This signal may be used as a feedback signal that is provided to the controller 40 as further shown in FIG. 9c.

The particular feedback control circuit or algorithm utilized by the controller 40 is outside the scope of this invention and will not be discussed in detail here. Suffice it to say that such feedback algorithms are many and varied and are generally known. An illustrative example is a set of two control loops in which the controller 40 uses a constant power control loop to control the pump power via the modulator 50 based on the feedback signal from the pump laser 2 and a gain control loop that adjusts the set point of the constant power loop based on the feedback signal derived from the output of the amplifier 80.

An alternative to PWM-based control is to use a fixed pulse width and vary the frequency of the pulses according to the control signal from controller 40. Both PWM and frequency modulated signals are within the scope of a so-called "modulated" control signal as that term is utilized herein.

Figure 10:
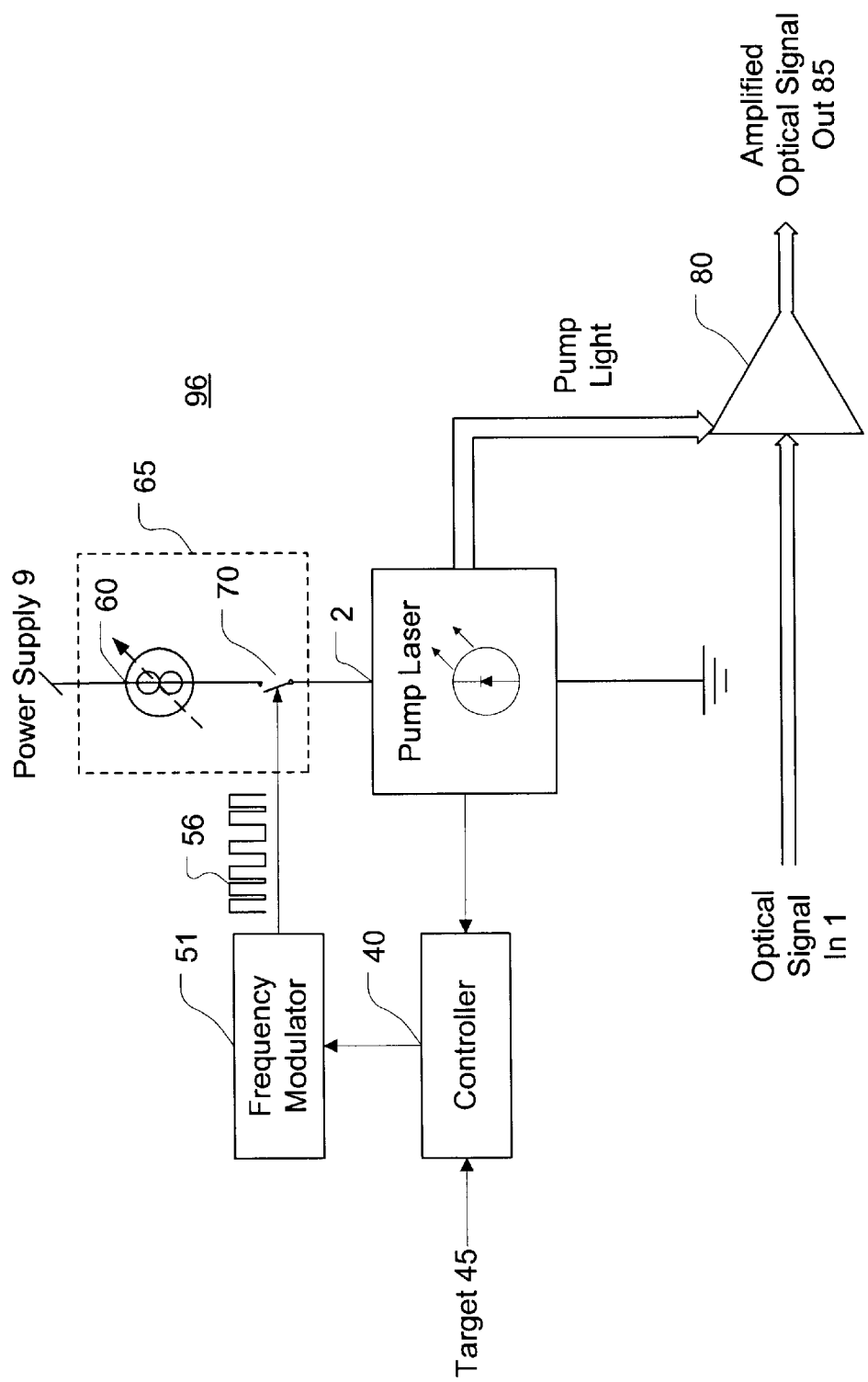
FIG. 10 is a high level block diagram illustrating components of another inventive optical amplifier alternative.

FIG. 10 illustrates a frequency modulated embodiment of the invention which shares many components with the FIG. 9a embodiment. Indeed, the main difference is the use of a frequency modulator 51 in place of the pulse width modulator 50. Such frequency modulators, in and of themselves, are conventional and will not be discussed further. The frequency modulator 51 outputs a frequency modulated control signal 56 to the switch 70 in response to the control signal from controller 40.

As an alternative to the discrete current source 60 and controllable switch 70, it is also possible to use an integrated component in which the controllable switch function is integrated into a current source. Such a switched current source 65 is diagrammatically indicated in FIGS. 8, 9a, 9b, 9c, and 10 with dashed lines to indicate this optional configuration. In this optional configuration, the switched current source 65 receives the modulated control signal from the modulator (50, 51, etc depending upon whether a pulse width modulator, frequency modulator or other modulator is used to generate the modulated signal) and actuates to repeatedly turn the drive current supplied to the pump 2 "on" and "off".

Figure 12:
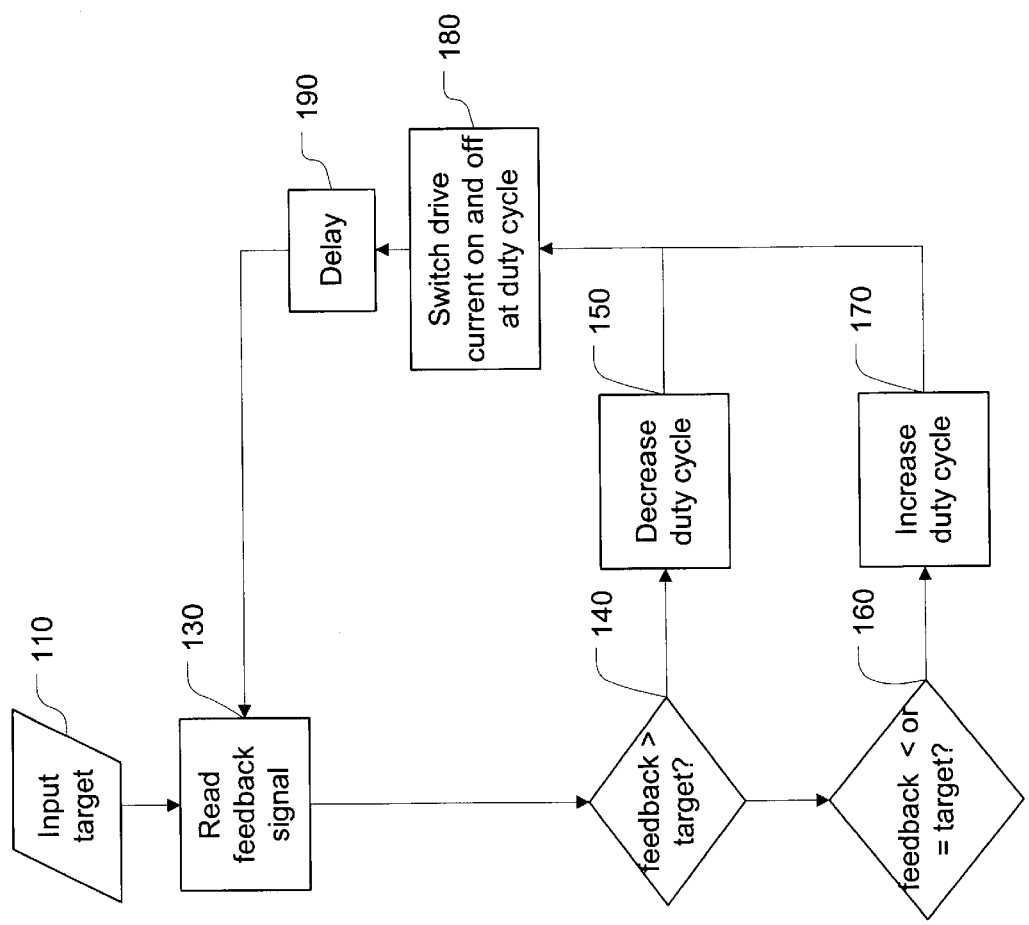
FIG. 12 is a high level flowchart illustrating exemplary operation of the inventive controller.

FIG. 12 illustrates an exemplary control methodology that may be used to operate the systems 90, 95, or 96 shown in FIGS. 8, 9 and 10. Specifically and as shown in FIG. 12, the method may begin with inputting the target 45 (step 110). If the target 45 is a gain value and the feedback signal from power measuring circuit 49 or optical power monitor 48 is a power measurement, then the target gain may be converted to a target power level. Such a conversion may be done via electronic circuitry in the controller 40, an equation programmed or implemented within controller 40, a look-up table, etc. In some cases, such as when the target 45 value relates directly to the feedback signal, then no such conversion is necessary.

The method proceeds by reading the feedback signal (step 130). This may be done by inputting, reading, or otherwise obtaining the feedback signal from pump laser 2 that indicates the output power of the pump 3. As mentioned above, this feedback signal may be from a back-facet diode in pump 3 but it may be generated by other means. The feedback signal may also be obtained from the power measuring circuit 49 or optical power monitor 48.

The feedback signal is then compared against the target 45 (steps 140 and 160). If the feedback>target then the pump laser 2 is being driven too hard and the controller 40 decreases the duty cycle (step 150) by controlling the pulse-width modulator 50 (or frequency modulator in the FIG. 10 embodiment). On the other hand, if the feedback≦target then the pump laser 2 is not being driven hard enough and the controller 40 increases the duty cycle (step 170) by controlling the pulse-width modulator 50 (or frequency modulator 51 in the FIG. 10 embodiment).

The method then proceeds to switch the drive current being supplied to the pump on and off according to the duty cycle (180)

A delay (190) may also be introduced after adjusting the duty cycle (150, 170) and switching the drive current (180) in order for the system to stabilize before making further adjustments.

The order of the steps outlined in FIG. 12 is not critical to the proper operation of the inventive method. For instance, the switching (180) may precede the adjustments (150, 170) to the duty cycle.

The control algorithm outlined in FIG. 12 or otherwise utilized by the inventive controller 40 may use any conventional control technique such as PID in order to bring the output power of the optical amplifier 80 to a desired or target value 45.

Moreover, the control scheme need not be algorithmic. As an alternative, analog control circuitry could be used. For example, instead of a PID or software algorithm, a differential integrator may compare the backfacet monitor signal with the "target", and the integrator output could direct the PWM duty cycle. In systems where there is no microprocessor nearby, this implementation may actually be preferred.

Moreover, the target 45 input shown in FIGS. 9a, 9b, 9c and 10 is entirely optional. The control set point may be stored, preprogrammed, preset, hardwired etc such that the controller 40 strives to achieve an output power that substantially matches the set point (target 45). Alternatively, a potentiometer, DIP switch, or other manually adjustable circuit element may be used to determine the target value. The ability to input an arbitrary target via target 45 input does have its advantages such as the ability to adjust the gain or output power level of the optical amplifier 80. Moreover, the target 45 may be commanded by a supervisory control system that supervises, for example, a telecommunications node, span, or system.

Figure 11:
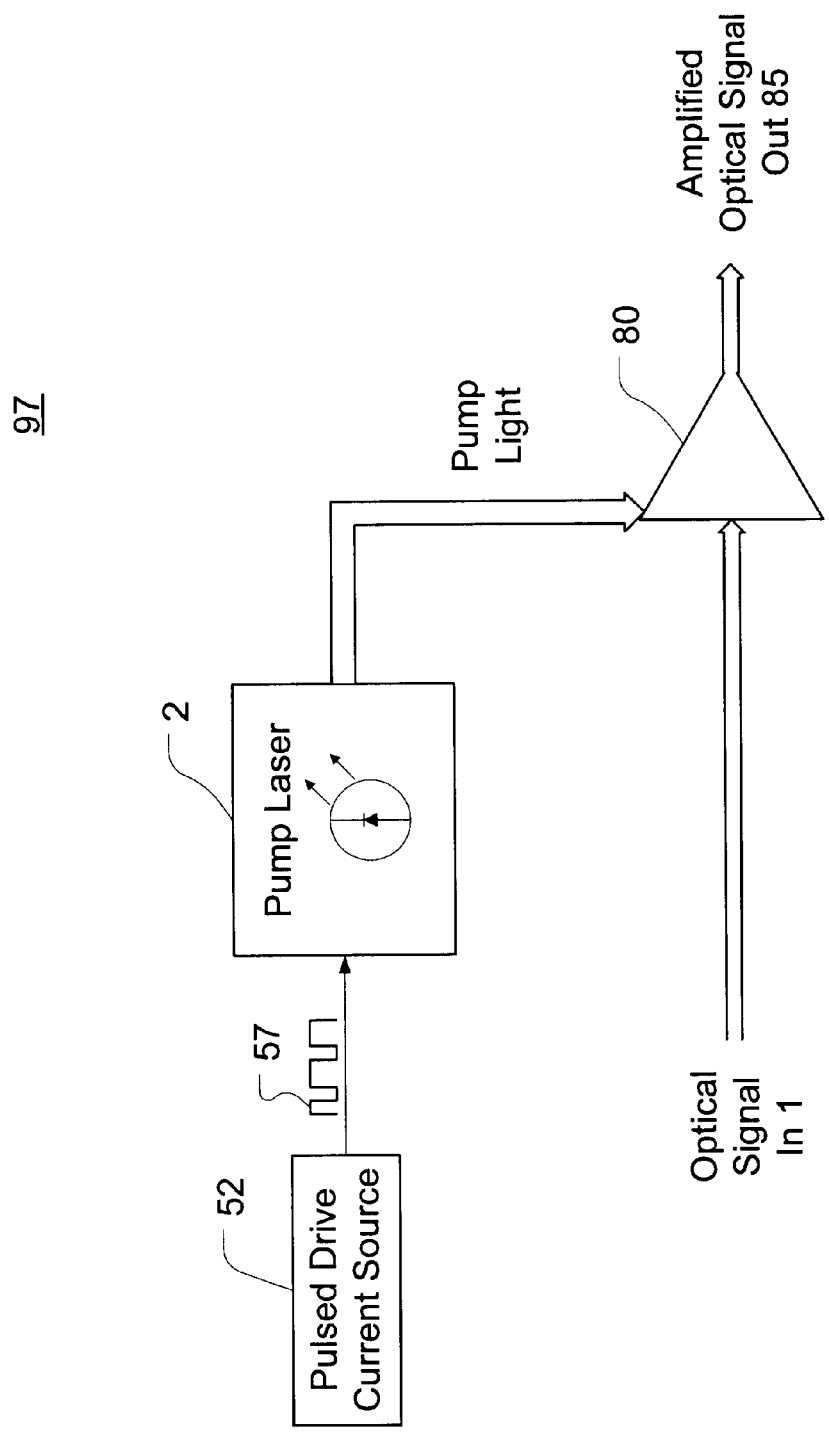
FIG. 11 is a high level block diagram illustrating components of yet another inventive optical amplifier alternative.

Another alternative of the inventive architecture is shown in FIG. 11. This alternative essentially eliminates the controller 40 and is intended for optical amplifiers in which a dynamically controlled gain or power level is not desired. As shown in FIG. 11, this construction essentially includes a pulsed current source 52 which supplies a pulsed drive current 57 to the pump laser 2. The duty cycle may be fixed at the factory based on a priori knowledge of the amplifier, test measurements, calculations, etc. The duty cycle may also be manually adjusted by, for example, using a potentiometer or other manually adjustable circuit element in the pulsed drive current source 52. The pulse drive current source may be constructed in a variety of fashions including the power supply 9, current source 60 and controllable switch 70 architecture shown in FIGS. 8–10. Such pulsed drive current sources may also be constructed from commercially available integrated circuits that incorporate the PWM and switch elements together in the same package (e.g. typically used in switched mode power supplies or DC/DC converters). Such commercially available circuits are usually configured as pulsed voltage sources but the simple addition of a resistor can turn them into a pulsed current source.

The present invention expands the usable gain range (and optical power output levels) of optical amplifiers, particularly in the lower end of these ranges. The inventive control techniques and hardware generally requires that the optical amplifier exhibit gain latency. In other words, the optical amplifiers that benefit from the inventive techniques are those in which "off" periods in a pulse-width modulated pump light signal would be smoothed out such that the average power is determined by the ratio of pulse on to pulse off (on/off).

Although the PWM signal 55 is shown as a square wave with an adjustable pulse width or duty cycle, the PWM signal may take a variety of other forms and still be consistent with the inventive concepts. For example, a non-square waveform such as a saw tooth or sinusoidal waveform may be utilized. In general, the invention may use any modulation format other than CW such as amplitude modulation, frequency modulation, on and off modulation, sinusoidal modulation, etc. which effectively lowers the average pump power applied to the gain medium while maintaining peak pump power to a certain range to avoid the problems outlined above such as mode competition and gain instability.

A waveform shape having a fast rise/fall time is much preferred because a slow ramp up/down may cause pump laser mode hopping and the resultant gain/power fluctuations described above. Fast rise/fall times also have the benefit of lower power consumption because they minimize the power dissipated by the switch 70 itself and thereby permits the use of a small, inexpensive switch element for switch 70.

In actual experiments conducted by the inventors in which a PWM square wave signal was applied to an EDFA pumped by a 980 nm pump laser, the frequency of the PWM signal was tested down to 1 Khz. The gain latency in the EDFA was sufficient to average out the pulse off times and produce a stable and controllable amplifier gain and output power. Specifically, the inventors were able to realize a variable stable gain of –10 dB to +33 dB, while varying the duty cycle of the PWM waveform from 10.7% to 64.7%. In other words, over 40 dB of stable gain control was achieved in an experimental implementation and no pump laser mode competition was observed with a optical spectrum analyzer. These are excellent results that could show further improvement through optimization.

Although the invention is illustrated with respect to a single pump laser 2, the invention is not so limited. As is well known in the art, optical amplifiers may be pumped by more than one pump laser. A typical example is pumping with both 980 nm and 1480 nm lasers. If multiple pumps are used then the invention may be extended such that each (or at least some of the) pump laser(s) would be driven by a pulse-width modulated current using an arrangement like the current source 60, controller 40, and pulse-width modulator 50 arrangement or the other architectures discussed above. Of course, some components such as the power supply 9 and switch 70 may be shared among multiple pump lasers. Sharing the current source 60 is generally undesirable due to current "hogging" effects.

Another alternative is to directly modulate the pump light itself with a high speed shutter mechanism, electro-absorption modulator, etc rather than modulate the drive current supplied to the pump laser 2. In other words, a light modulating element such as an electro-absorption modulator could be placed between the pump laser 2 and the optical amplifier 80 in order to directly modulate the pump light. The same control theory would apply but to a light modulator rather than the switch 70. This alternative is not preferred due to the high cost of light modulators and the increased system power requirement of operating the pump at full power continuously. The electronic control and modulation circuitry preferred herein is much less expensive than such light modulators.

The applications for an optical amplifier having a wide gain range are many and varied. The invention finds particular utility in optical amplifiers that benefit from a wide dynamic range, particularly in the lower end. Conventional optical amplifiers having gain latency (e.g. EDFAs) suffer from gain/output power instabilities at low gain/power levels (e.g. under 10 milliwatts pump power in the particular example discussed above). The invention overcomes these shortcomings.

One example of where the inventive amplifier system (90, 95) finds particular utility is pre-amplification at a receiver node. Such a preamplifier would precede an optical receiver. Advantages to such pre-amplification include increasing the effective distance between the last node (e.g. transmitter, optical line amplifier, etc) and the receiver.

Another example is an optical amplifier used as part of a receiver AGC (automatic gain control) application where it may be necessary to have the ability to amplify weak signals by a large amount and provide a modest gain (or even loss) when the input signal is at a high level. For example, an APD or PIN receiver may expect the incoming signal to be within a certain power level range. If outside this range, the receiver may not work effectively. Pre-amplification may improve the receiver's ability to cope with such a situation. Because the needed pre-amplification is oftentimes quite low conventional optical amplifiers are not suited to this application.

Yet another application of the inventive amplifiers is as a variable gain insertion level management device for DWDM (dense wavelength division multiplexed) or WDM (wavelength division multiplexed) systems. Amplified WDM and DWDM systems require some degree of amplitude normalization between the individual carriers (wavelength channels), and if DWDM systems are interconnected, some means needs to be deployed to insure that the inserted carriers are injected at levels close to the existing carriers on the system. The inventive amplifiers address these issues by providing a stable gain over a wide dynamic range including a low amplification for fine tuning amplitudes and negative amplification (attenuation) that may be necessary to equalize the amplitudes of the individual carriers.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical amplifier, comprising:
   a gain media exhibiting gain latency and receiving an input optical signal;
   an optical pump optically coupled to said gain media, said optical pump supplying pumping light to said gain media, said pumping light having at least one wavelength sufficient to induce gain in the input optical signal;
   a current source operatively connected to said optical pump, said current source providing a drive current to said optical pump;
   a switch interposed between said current source and said optical pump;
   a modulator operatively connected to said switch;
   said modulator generating modulated signals having a duty cycle and supplying the modulated signals to said switch, said switch actuating in response to the modulated signal such that said switch repeatedly turns the drive current "on" and "off", and wherein the gain latency permits a substantially continuous signal to be output from the optical amplifier in response to said switch actuating.

2. The optical amplifier according to claim 1, further comprising:
   a controller operatively connected to said modulator, said controller supplying a control signal to said modulator to control the duty cycle of the modulated signal,
   said modulator generating modulated signals in response to the control signal.

3. The optical amplifier according to claim 2,
   said controller also operatively connected to said optical pump,
   said controller receiving a feedback signal from said optical pump indicative of the pumping light generated by said optical pump, and
   said controller utilizing the feedback signal to control the duty cycle of the modulated signal.

4. The optical amplifier according to claim 3,
   said controller receiving a target indicative of a target pump power level to be achieved by said optical pump;
   said controller feedback controlling said modulator according to the feedback signal such that said optical pump substantially achieves the target.

5. The optical amplifier according to claim 3,
   said controller storing a target indicative of a target pump power level to be achieved by said optical amplifier;
   said controller feedback controlling said modulator according to the feedback signal such that said optical pump substantially achieves the target.

6. The optical amplifier according to claim 2, further comprising:
   an optical power monitor optically coupled to an output of the optical amplifier; said controller also operatively connected to said optical power monitor,
   said controller receiving a feedback signal from said optical power monitor indicative of an optical power of the signal output from the amplifier, and
   said controller utilizing the feedback signal to control the duty cycle of the modulated signal.

7. The optical amplifier according to claim 2, further comprising:
   a receiver optically coupled to an output of the optical amplifier;
   a power monitoring circuit operatively coupled to said receiver;
   said controller also operatively connected to said power monitoring circuit,
   said controller receiving a feedback signal from said power monitoring circuit indicative of an optical power of the signal output from the amplifier, and
   said controller utilizing the feedback signal to control the duty cycle of the modulated signal.

8. The optical amplifier according to claim 2, wherein said modulator is a pulse-width modulator,
   said pulse-width modulator generating pulse-width modulated signals in response to the control signal and supplying the pulse-width modulated signals to said switch;
   said controller supplying the control signal to control a duty cycle of the pulse-width modulated signal.

9. The optical amplifier according to claim 2, wherein said modulator is a frequency modulator that modulates a frequency of pulses having a fixed pulse-width, said frequency modulator generating frequency modulated signals in response to the control signal and supplying the frequency modulated signals to said switch;

said controller supplying the control signal to control a duty cycle of the frequency modulated signal.

10. The optical amplifier according to claim 1, wherein the gain media is a length of erbium doped fiber, a length of thulium doped fiber, an erbium doped waveguide, or a thulium doped waveguide.

11. The optical amplifier according to claim 3, wherein said optical pump including a back-facet diode, the back-facet diode supplying the feedback signal to said controller.

12. The optical amplifier according to claim 1, wherein said optical pump including more than one pumping laser.

13. The optical amplifier according to claim 1,
wherein said current source and said switch are integrated in a switched current source operatively connected to said optical pump and to said modulator,
wherein said switched current source actuates in response to the modulated signal such that said switch repeatedly turns the drive current "on" and "off".

14. A power control circuit for an optical amplifier exhibiting gain latency and having an optical pump powered by a drive current from a current source, comprising:
a switch interposed between the current source and the optical pump; and
a modulator operatively connected to said switch;
said modulator generating modulated signals having a duty cycle and supplying the modulated signals to said switch,
said switch actuating in response to the modulated signal such that said switch repeatedly turns the drive current "on" and "off", and wherein the gain latency permits a substantially continuous signal to be output from the optical amplifier in response to said switch actuating.

15. The power control circuit for an optical amplifier according to claim 14, further comprising:
a controller operatively connected to said modulator, said controller supplying a control signal to said modulator to control the duty cycle of the modulated signal,
said modulator generating modulated signals in response to the control signal.

16. The power control circuit for an optical amplifier according to claim 15,
said controller also operatively connected to the optical pump,
said controller receiving a feedback signal from the optical pump indicative of the pumping light generated by the optical pump, and
said controller utilizing the feedback signal to control said modulator.

17. The power control circuit for an optical amplifier according to claim 16,
said controller receiving a target indicative of a target pump power level to be achieved by the optical pump;
said controller feedback controlling said modulator according to the feedback signal such that the optical pump substantially achieves the target.

18. The power control circuit for an optical amplifier according to claim 16,
said controller storing a target indicative of a target pump power level to be achieved by the optical pump;
said controller feedback controlling said modulator according to the feedback signal such that the optical pump substantially achieves the target.

19. The power control circuit according to claim 15, further comprising:
an optical power monitor optically coupled to an output of the optical amplifier; said controller also operatively connected to said optical power monitor,
said controller receiving a feedback signal from said optical power monitor indicative of an optical power of the signal output from the amplifier, and
said controller utilizing the feedback signal to control the duty cycle of the modulated signal.

20. The power control circuit according to claim 15, further comprising:
a receiver optically coupled to an output of the optical amplifier;
a power monitoring circuit operatively coupled to said receiver;
said controller also operatively connected to said power monitoring circuit,
said controller receiving a feedback signal from said power monitoring circuit indicative of an optical power of the signal output from the amplifier, and
said controller utilizing the feedback signal to control the duty cycle of the modulated signal.

21. The power control circuit for an optical amplifier according to claim 15, wherein said modulator is a pulse-width modulator,
said pulse-width modulator generating pulse-width modulated signals in response to the control signal and supplying the pulse-width modulated signals to said switch;
said controller supplying the control signal to control a duty cycle of the pulse-width modulated signal.

22. The power control circuit for an optical amplifier according to claim 15, wherein said modulator is a frequency modulator that modulates a frequency of pulses having a fixed pulse-width,
said frequency modulator generating frequency modulated signals in response to the control signal and supplying the frequency modulated signals to said switch;
said controller supplying the control signal to control a duty cycle of the frequency modulated signal.

23. The power control circuit for an optical amplifier according to claim 14, wherein the gain media is a length of erbium doped fiber, a length of thulium doped fiber, an erbium doped waveguide, or a thulium doped waveguide.

24. The power control circuit for an optical amplifier according to claim 14,
wherein said switch and the current source are integrated in a switched current source operatively connected to the optical pump and to said modulator,
wherein said switched current source actuates in response to the modulated signal such that said switch repeatedly turns the drive current "on" and "off".

25. A method of controlling an optical amplifier exhibiting gain latency and having an optical pump driven by an electrical current, comprising:
switching the electrical current supplied to the optical pump "on" and "off"; and
controlling said switching with a modulated signal having a duty cycle in order to control a relative duration of the "on" and "off" periods of the electrical current supplied to the optical pump,
wherein the gain latency in the optical amplifier permits a substantially continuous signal to be output from the optical amplifier in response to the switched electrical current supply to the optical pump.

26. The method of controlling an optical amplifier according to claim 25, further comprising:

receiving a feedback signal from the-optical pump indicative of the pumping light generated by the optical pump; and utilizing the feedback signal to control the duty cycle of the modulated signal.

27. The method of controlling an optical amplifier according to claim 26, inputting a target indicative of a target pump power level to be achieved by the optical pump; and feedback controlling the duty cycle of the modulated signal according to the feedback signal such that the optical pump substantially achieves the target.

28. The method of controlling an optical amplifier according to claim 25, receiving a feedback signal from a power monitoring device indicative of an optical power of the signal output from the amplifier, and utilizing the feedback signal to control the duty cycle of the modulated signal.

29. The method of controlling an optical amplifier according to claim 25, wherein the modulated signal is a pulse-width modulated signal and the duty cycle relates to the pulse width.

30. The method of controlling an optical amplifier according to claim 25, wherein the modulated signal is a frequency modulated signal and the duty cycle relates to the frequency of fixed-width pulses.

* * * * *